United States Patent
Wang et al.

(10) Patent No.: US 12,117,312 B2
(45) Date of Patent: Oct. 15, 2024

(54) SYSTEMS AND METHODS FOR VEHICLE MAPPING AND LOCALIZATION USING SYNTHETIC APERTURE RADAR

(71) Applicant: Zendar Inc., Berkeley, CA (US)

(72) Inventors: Ching Ming Wang, Berkeley, CA (US); Jeffrey Minoru Adachi, Berkeley, CA (US)

(73) Assignee: Zendar Inc., Berkeley, CA (US)

(*) Notice: Subject to any disclaimer, the term of this patent is extended or adjusted under 35 U.S.C. 154(b) by 456 days.

(21) Appl. No.: 17/406,806

(22) Filed: Aug. 19, 2021

(65) Prior Publication Data

US 2022/0065657 A1    Mar. 3, 2022

Related U.S. Application Data

(63) Continuation of application No. PCT/US2020/018995, filed on Feb. 20, 2020.

(60) Provisional application No. 62/808,739, filed on Feb. 21, 2019.

(51) Int. Cl.
| | |
|---|---|
| *G01C 21/00* | (2006.01) |
| *G01C 21/32* | (2006.01) |
| *G01S 13/90* | (2006.01) |
| *G01S 13/931* | (2020.01) |

(52) U.S. Cl.
CPC ......... *G01C 21/3848* (2020.08); *G01C 21/32* (2013.01); *G01C 21/387* (2020.08); *G01S 13/9005* (2013.01); *G01S 13/931* (2013.01)

(58) Field of Classification Search
CPC .. G01C 21/3848; G01C 21/387; G01C 21/32; G01C 21/38; G01C 21/3804; G01C 21/3833; G01C 21/3863; G01S 13/9005; G01S 13/931; G01S 13/9004;
(Continued)

(56) References Cited

U.S. PATENT DOCUMENTS

| | | |
|---|---|---|
| 5,424,742 A | 6/1995 | Long |
| 9,255,805 B1 | 2/2016 | Ferguson |
| 2015/0025788 A1 | 1/2015 | Crain |

(Continued)

OTHER PUBLICATIONS

Nguyen L. Signal processing techniques for the U.S. Army Research Laboratory stepped frequency ultra-wideband radar. Proceedings of SPIE; [Proceedings of SPIE ISSN 0277-786X vol. 10524], SPIE, US, vol. 10188, May 1, 2017 (May 1, 2017), pp. 101880J-101880J, XP060089043.

(Continued)

*Primary Examiner* — Vladimir Magloire
*Assistant Examiner* — Remash R Guyah
(74) *Attorney, Agent, or Firm* — Brake Hughes Bellermann LLP

(57) ABSTRACT

A system for generating a map is disclosed herein. The system may comprise a synthetic aperture radar (SAR) unit mountable to a terrestrial vehicle. The system may further comprise one or more computer processors operatively coupled to the SAR unit. The one or more computer processors may be individually or collectively programmed to: (i) while the terrestrial vehicle is in motion, use the SAR unit to (1) transmit a first set of signals to an environment external to the vehicle and (2) collect a second set of signals from the environment; and (ii) use at least the second set of signals to generate the map of the environment in memory.

34 Claims, 7 Drawing Sheets

(58) Field of Classification Search
CPC .......... G01S 13/90; G01S 13/89; G01S 13/88;
G01S 2013/9315
USPC ...................................................... 342/25 A
See application file for complete search history.

(56) References Cited

U.S. PATENT DOCUMENTS

2017/0307746 A1    10/2017  Rohani
2017/0307751 A1*   10/2017  Rohani ................ G01S 13/867
2018/0149742 A1     5/2018  Izadian
2019/0079177 A1*    3/2019  Lee ...................... G01S 13/422

OTHER PUBLICATIONS

Giorgio F. FloSar: A new concept for Synthetic Aperture Radar. Radar Conference, 2008. Radar '08. IEEE, IEEE, Piscataway, NJ, USA, May 26, 2008 (May 26, 2008), pp. 1-4, XP031376068.
Sommer A. 3D multiple input single output near field automotive synthetic aperture radar. 2017 18th International Radar Symposium (IRS), German Institute of Navigation-Dgon, Jun. 28, 2017 (Jun. 28, 2017), pp. 1-10, XP033142240.
Ressler M. The Army Research Laboratory (ARL) synchronous impulse reconstruction (SIRE) forward-looking radar, Proceedings of SPIE, vol. 6561, Apr. 27, 2007, p. 656105, XP055878257.
Nguyen, L. Augmented reality using ultra-wideband radar imagery, Proceedings SPIE, vol. 8021, Jun. 21, 2011, p. 802104, XP040560513.
Feger R. Experimental verification of a 77-GHz synthetic aperture radar system for automotive applications, 2017 IEEE MTT-S International Conference on Microwaves for Intelligent Mobility, Mar. 19, 2017, pp. 111-114, XP033092032.
DE 10 2010 048896 AI (Volkswagen AG [DE]) Apr. 19, 2012 (Apr. 19, 2012) * paragraph [0047].

* cited by examiner

SYSTEMS AND METHODS FOR VEHICLE MAPPING AND LOCALIZATION USING SYNTHETIC APERTURE RADAR

CROSS-REFERENCE

This application is a Continuation of International Application No. PCT/US2020/018995, filed Feb. 20, 2020 which claims the benefit of U.S. Patent Application No. 62/808,739, filed Feb. 21, 2019, which is entirely incorporated herein by reference.

BACKGROUND

Autonomous vehicles are designed to sense where they are with respect to an external environment and to identify what is around them as they drive through an environment. Information about the position of the vehicle and the location of objects near the vehicle can help an autonomous vehicle controller anticipate upcoming road features and navigate the vehicle around road features within its motion path.

SUMMARY

In the autonomous vehicle mapping and navigation systems and methods disclosed herein, maps (e.g., a high-definition (HD) map) of an environment can be constructed or updated, either substantially in real-time (online) as a vehicle is moving, or offline using previously collected data. The location of the vehicle can be determined using the maps, which may be constructed offline or online, and/or one or more positional sensors. In some cases, the autonomous vehicle mapping and navigation systems and methods disclosed herein may also perform mapping and localization simultaneously. Simultaneous localization and mapping (SLAM) is the computational problem of constructing or updating a map (e.g., a high-definition (HD) map) of the environment while simultaneously tracking the vehicle's autonomous vehicle location within the environment. An HD map may be a local map of the environment that contains a large number of features relevant for driving, such as road signs, lane markings, curbs, buildings, and so forth. In some embodiments, an autonomous vehicle may employ onboard sensors, such as global navigation satellite system (GNSS), inertial measurement unit (IMU), light detection and ranging (lidar), cameras, or synthetic aperture radar (SAR), to sense features of the surrounding environment for localization, which involves the process of locating the vehicle with respect to the HD map. An autonomous vehicle may compare these features to information recorded in an HD map.

The present disclosure provides systems and methods that use high-resolution radar images (e.g., a SAR image) to improve localization of an autonomous vehicle. Some existing map-based localization systems employed within an autonomous vehicle use a camera(s) in combination with lidar. However, a camera alone is unable to measure the three dimensional (3D) structure of an environment with high accuracy. Moreover, cameras are not very reliable in the presence of strong light/low light, glare, fog, rain or snow. Lidar provides 3D information that helps to augment data captured using a camera; however, lidar is expensive and suffers from poor performance in bad weather. Moreover, typical automotive radar sensors do not have sufficient spatial resolution to provide the performance required for high-resolution mapping and localization applications. A SAR, on the other hand, provides very high spatial resolution making it ideal for mapping and localization applications. A SAR-based system as disclosed herein can provide high resolution radar imagery from a moving terrestrial platform or terrestrial vehicle by accurately measuring and tracking the position of a terrestrial vehicle, simulating a large antenna or aperture electronically and/or virtually based on the motion path of the vehicle, and combining raw radar returns from different times and/or vehicle positions to produce coherent high resolution images. Compared to lidar-based systems, SAR-based systems also operate better in bad weather situations, are relatively inexpensive, and can be mounted inconspicuously on a vehicle. Additionally, SAR-based systems have longer ranges than typical lidar-based systems, can penetrate foliage to reach more stable features, and have a high dynamic range, thus allowing SAR-based systems to easily distinguish between various features based on the intensity of the radar signals returned. As such, SAR has the potential to replace lidar for the purpose of localization as it provides a valuable complement to improve the resolution and reliability of lidar-based localization systems. The systems and methods disclosed herein can improve the resolution of a mapping and localization system on a vehicle, for example, by employing a SAR (or a SAR-based system).

In an aspect, the present disclosure provides a method for generating a map using synthetic aperture radar, the method comprising: (a) providing a synthetic aperture radar (SAR) unit mounted on a terrestrial vehicle; (b) while the terrestrial vehicle is in motion, using the SAR unit to (i) transmit a first set of signals to an environment external to the vehicle and (ii) collect a second set of signals from the environment; and (c) with aid of a controller, using at least the second set of signals to generate the map of the environment in memory.

In some embodiments, the map may comprise a local map having a plurality of features positioned relative to, and in a vicinity of the vehicle.

In some embodiments, the method may further comprise generating a plurality of local maps, wherein two or more of the plurality of local maps overlap with one another. In some embodiments, the method may further comprise aligning the plurality of local maps to one another to generate a regional map that covers a plurality of regions within the environment. In some embodiments, the method may further comprise using the aligned plurality of local maps to estimate a local motion of the vehicle in the environment. In some embodiments, the method may further comprise aligning one or more of the plurality of local maps with the regional map and using in part the alignment to determine a pose of the vehicle.

In some embodiments, the local map or the plurality of local maps may be generated with aid of one or more processors located onboard the vehicle, wherein the controller comprises the one or more processors. In some embodiments, the regional map may be generated with aid of one or more processors located remote to the vehicle, wherein the controller comprises the one or more processors.

In some embodiments, the local motion or the pose of the vehicle may be determined with aid of one or more processors located onboard the vehicle, wherein the controller comprises the one or more processors.

In some embodiments, the SAR unit may comprise a plurality of SAR units, and the vehicle may comprise a plurality of vehicle, wherein the plurality of SAR units are mounted on the plurality of vehicles. In some embodiments, the second set of signals may comprise a plurality of second set of signals collected using the plurality of SAR units mounted on the plurality of vehicles.

In some embodiments, the method may further comprise generating a plurality of local maps using the plurality of second set of signals, wherein the plurality of local maps comprises a plurality of features in a vicinity of the plurality of vehicles. In some embodiments, the method may further comprise aligning the plurality of local maps to one another to generate a regional map that covers a plurality of regions within the environment.

In some embodiments, the generation of the regional map may comprise resolving local inconsistencies at loop closures and aligning to a reference set of global coordinates for a single vehicle or for a plurality of vehicles.

In some embodiments, the second set of signals may be generated upon the first set of signals interacting with at least one object in the environment.

In some embodiments, the SAR unit may be mounted in a forward-facing direction, a rear-facing direction, a side-facing direction, a squinted direction of the terrestrial vehicle, or any arbitrary orientation around the vehicle.

In some embodiments, the method may further comprise using a vehicle position sensor to collect a third set of signals comprising position, orientation, and velocity measurements of the terrestrial vehicle, while the terrestrial vehicle is in motion. In some embodiments, the method may further comprise, with aid of the controller, using at least the second set of signals and the third set of signals to generate the map of the environment in memory. In some embodiments, the vehicle position sensor may comprise at least one member selected from the group consisting of an inertial measurement unit, a Global Navigation Satellite System (GNSS) receiver, a camera, a light detection and ranging (lidar) unit, a wheel encoder, and a radar.

In some embodiments, the pose may comprise a position, orientation, and velocity of the terrestrial vehicle.

In some embodiments, the map may comprise a SAR-based image comprising a plurality of features located within the environment.

In some embodiments, the map may comprise a high definition (HD) map of the environment.

In some embodiments, the method may further comprise, with aid of the SAR unit, a positioning sensor, and the controller, refining or updating the pose of the terrestrial vehicle based on a movement of the terrestrial vehicle through the environment. In some embodiments, the pose of the terrestrial vehicle may be refined or updated using a plurality of SAR-based images and/or SAR-based velocity estimates generated based on the movement of the terrestrial vehicle through the environment.

In some embodiments, the method may further comprise obtaining a refined tracklog of the terrestrial vehicle based on the refined or updated pose. In some embodiments, the method may further comprise using the refined tracklog in a feedback mode to improve one or more previously generated SAR-based images and/or a localization result of the vehicle. In some embodiments, the method may further comprise using the refined tracklog in a feedforward mode to improve future tracklog estimates and SAR-based images, without needing to modify one or more previously generated SAR-based images and/or a localization result of the vehicle.

In some embodiments, the pose of the terrestrial vehicle may be determined based at least in part by comparing a set of features in a selected local map with a set of features in the regional map.

In another aspect, the present disclosure provides a system for generating a map, the system comprising a synthetic aperture radar (SAR) unit mountable to a terrestrial vehicle and one or more computer processors operatively coupled to the SAR unit, wherein the one or more computer processors are individually or collectively programmed to: (i) while the terrestrial vehicle is in motion, use the SAR unit to transmit a first set of signals to an environment external to the vehicle and collect a second set of signals from the environment, and (ii) use at least the second set of signals to generate the map of the environment in memory.

In some embodiments, the system may further comprise the terrestrial vehicle, wherein the SAR unit is mounted on the terrestrial vehicle. In some embodiments, the system may further comprise a vehicle position sensor configured to collect a third set of signals comprising position and orientation measurements of the terrestrial vehicle, while the terrestrial vehicle is in motion.

In some embodiments, the one or more computer processors may be individually or collectively programmed to use at least the second set of signals and the third set of signals to generate the map of the environment in memory.

In some embodiments, the vehicle position sensor may comprise at least one member selected from the group consisting of an inertial measurement unit, a Global Navigation Satellite System (GNSS) receiver, a camera, a light detection and ranging (lidar) unit, a wheel encoder, and a radar.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1A:
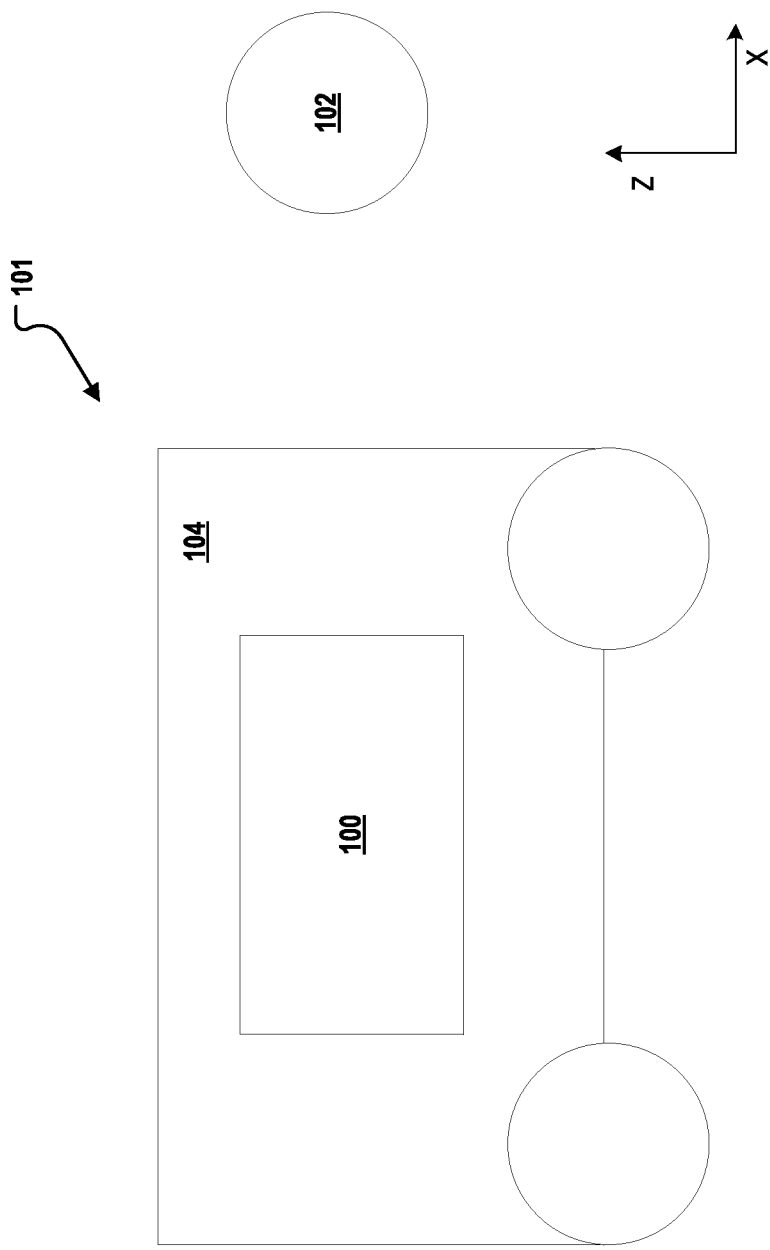
FIG. 1A depicts a system that can be used on a vehicle to detect one or more targets in a surrounding environment, in accordance with some embodiments.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

The term "terrestrial vehicle," as used herein, generally refers to a vehicle that is configured to operate by contacting the ground or at a location below the ground. In some examples, the terrestrial vehicle is a car, bus, train, truck, bicycle, motorcycle, scooter, boat, submarine, or any transportation device for use on the ground. The terrestrial vehicle can be a car. The terrestrial vehicle can be any machinery that normally operates by contacting the ground or operating below ground, such as, for example, a robot for ground use. In some cases, the terrestrial vehicle may be an autonomous or semi-autonomous vehicle.

Whenever the term "at least," "greater than," or "greater than or equal to" precedes the first numerical value in a series of two or more numerical values, the term "at least," "greater than," or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of a SAR-based system, such as depicted in FIGS. 1-6.

In some embodiments, a terrestrial vehicle may be configured to operate in a surrounding environment. A surrounding environment may be a location and/or setting in which the vehicle may operate. A surrounding environment may be an indoor or outdoor space. A surrounding environment may be an urban, suburban, or rural setting. A surrounding environment may be a high altitude or low altitude setting. A surrounding environment may include settings that provide poor visibility (night time, heavy precipitation, fog, particulates in the air).

A surrounding environment may include features that are on or near a travel path of a vehicle. In some cases, a surrounding environment may include features that are outside of a travel path of a vehicle. Features may include markings and/or signals relevant for driving, such as road signs, lane markings, and/or traffic lights. In some cases, features may be objects external to the vehicle. For example, features may be a living being or an inanimate object. In some cases, a feature may be a pedestrian, an animal, a vehicle, a building, a sign post, a sidewalk, a sidewalk curb, a fence, a tree, or any object that may obstruct a vehicle traveling in any given direction. A feature may be stationary, moving, or capable of movement. A feature may be located in the front, rear, or lateral side of the vehicle. A feature may be positioned at a range of at least about 1 meter (m), 2 m, 3 m, 4 m, 5 m, 10 m, 15 m, 20 m, 25 m, 50 m, 75 m, or 100 m from the vehicle. A feature may be located on the ground, in the water, or in the air within the environment. A feature may be oriented in any direction relative to the vehicle. A feature may be orientated to face the vehicle or oriented to face away from the vehicle at an angle ranging from 0 to about 360 degrees. Features may include multiple features external to a vehicle within the environment.

A feature may have a spatial disposition or characteristic that may be measured or detected by sensors employed within the SAR-based system. Spatial disposition information may include information about the position, velocity, acceleration, and other kinematic properties of the target relative to the vehicle. A characteristic of a feature may include information on the size, shape, orientation, and material properties, such as reflectivity, of the feature.

In some embodiments, a feature may have a size of at least 0.2 meters, be in a side facing direction of the vehicle, and be at least about 1 meter from the vehicle. In some embodiments, a feature may have a size of at least 0.2 meters, be in a forward or rear facing direction of the vehicle, and be at least about 1 meter from the vehicle.

In some embodiments, the terrestrial vehicle may be an autonomous vehicle. An autonomous vehicle may be an unmanned vehicle. The autonomous vehicle may or may not have a passenger or operator on-board the vehicle. The autonomous vehicle may or may not have a space within which a passenger may ride. The autonomous vehicle may or may not have space for cargo or objects to be carried by the vehicle. The autonomous vehicle may or may not have tools that may permit the vehicle to interact with the environment (e.g., collect samples, move objects). The autonomous vehicle may or may not have objects that may be emitted to be dispersed to the environment (e.g., light, sound, liquids, pesticides). The autonomous vehicle may operate without requiring a human operator. The autonomous vehicle may be a fully autonomous vehicle and/or a partially autonomous vehicle.

The autonomous vehicle may be configured to generate a map. A map may be a visual representation of a surrounding environment in which an autonomous vehicle may be operated. A map may include data relating to a pose of the autonomous vehicle. A pose of the autonomous vehicle may include a position and an orientation of the autonomous vehicle. In some cases, the pose of the autonomous vehicle may include a position of the autonomous vehicle, an orientation of the autonomous vehicle, and kinematic properties of the autonomous vehicle, such as a linear velocity, acceleration, and/or angular velocity of the autonomous vehicle. A map may also include data relating to the position, orientation, and kinematic properties (e.g., linear velocity, acceleration, and/or angular velocity) of one or more features in a surrounding environment. In some embodiments, the map may be generated by processing the pose of the vehicle, the kinematic properties of the vehicle, the position and orientation of one or more features in the surrounding environment, the kinematic properties of one or more features in the surrounding environment, or any combination thereof. Alternatively, the map may be generated using existing print or digital maps and/or map data compiled by a third-party service (e.g., Google™, Microsoft, MapQuest, etc.). In some cases, the map may be generated onboard the vehicle. In other cases, the map may be generated off-site on a server and provided to one or more processors or controllers located on the vehicle.

In some embodiments, the autonomous vehicle may be configured to generate one or more maps. The one or more maps may be a local map having a plurality of features positioned relative to, and in a vicinity of the autonomous vehicle. A local map may be a visual representation of a surrounding environment in which an autonomous vehicle may be operated. A local map may include data relating to the pose of the autonomous vehicle and the kinematic properties (e.g., linear velocity, acceleration, and/or angular velocity) of the autonomous vehicle as the vehicle moves through a surrounding environment. A local map may also include data relating to the position, orientation, and kinematic properties of one or more features in a surrounding environment. A local map may visually represent the pose of the autonomous vehicle and a movement of the autonomous vehicle relative to one or more features in the surrounding environment. In some cases, the autonomous vehicle may be configured to generate a plurality of local maps comprising one or more local maps. The one or more local maps of the plurality of local maps may overlap with each other. In some cases, the local maps may be aligned to build up larger local maps. In other cases, the local maps may be aligned to estimate the pose of the autonomous vehicle and a movement of the autonomous vehicle relative to one or more features in the surrounding environment.

In some embodiments, a plurality of local maps may be generated using one or more SAR-based systems mounted on an autonomous vehicle. In other embodiments, a plurality of local maps may be generated using one or more SAR-based systems mounted on a plurality of vehicles comprising the autonomous vehicle. The plurality of local maps may include a plurality of features in a vicinity of the autonomous vehicle or the plurality of vehicles. In some cases, the plurality of local maps may be used to generate a regional map. The regional map may be a globally aligned regional map. The globally aligned regional map may visually represent a plurality of regions within the surrounding environment. The globally aligned regional map may be a regional map generated by aligning one or more local maps of the plurality of local maps to each other and/or by aligning one or more of the local maps to the real world using one or more tie points. A tie point may be a feature identified on a local map which may correspond to a feature with a known location existing in the real world. In some cases, the one or more local maps of the plurality of local maps may be aligned to one another and/or aligned to the real world to generate a globally aligned regional map. The one or more local maps may be aligned to one another and/or aligned to the real world in part using a GNSS system (e.g., a GPS system). The GNSS system may provide one or more tie points which may be used to align the plurality of local maps to the real world or a previously generated map that is representative of the real world. In some cases, the GNSS system may provide a reference set of global coordinates which may be used to align the one or more local maps to each other or to align the plurality of local maps to the real world. In some embodiments, the one or more local maps may be aligned and used to estimate a local motion of the vehicle in the environment. In other embodiments, the one or more local maps may be aligned with the globally aligned regional map and used in part to determine a pose of the vehicle.

In some cases, generating the globally aligned regional map may involve resolving local inconsistencies at loop closures and aligning the one or more local maps of the plurality of local maps to a reference set of global coordinates. Resolving local inconsistencies at loop closures and aligning the one or more local maps to a reference set of global coordinates may be performed for a single vehicle and/or a plurality of vehicles to generate the globally aligned regional map. The plurality of local maps may be generated using one or more SAR-based systems mounted on an autonomous vehicle or one or more SAR-based systems mounted on a plurality of vehicles comprising the autonomous vehicle. The one or more SAR-based systems may comprise a transmitting antenna configured to transmit a first set of signals and a receiving antenna configured to receive a second set of signals. The second set of signals may be generated when the first set of signals is transmitted by the transmitting antenna and a subset of the first set of signals is reflected back to the receiving antenna after interacting with at least one object or feature in the surrounding environment. The second set of signals may comprise a plurality of second set of signals collected using the one or more SAR-based systems mounted on the plurality of vehicles. In some cases, the plurality of local maps may be generated by using the second set of signals received by the SAR-based system mounted on an autonomous vehicle. In other cases, the plurality of local maps may be generated by using the plurality of second set of signals received by the one or more SAR-based systems mounted on a plurality of vehicles.

In some embodiments, the autonomous vehicle may be configured to localize itself on a map. Localizing may involve using one or more local maps and one or more processors or controllers onboard the autonomous vehicle or off-site on a server to determine the pose of the autonomous vehicle on a map based on a movement of the autonomous vehicle through a surrounding environment.

In some embodiments, the autonomous vehicle may be further configured to perform simultaneous localization and mapping (SLAM). SLAM may involve using one or more processors or controllers onboard the vehicle or off-site on a server to simultaneously generate a map of a surrounding environment and localize the vehicle within the map by determining the pose of the vehicle as the vehicle moves through the surrounding environment.

In some embodiments, the autonomous vehicle may be configured to generate a map of a surrounding environment and to localize itself on a map with a degree of accuracy required for high-resolution mapping and localization and/or a degree of accuracy required for high-resolution simultaneous localization and mapping (SLAM). The degree of accuracy required for high-resolution mapping and localization and/or high-resolution SLAM may be a level of accuracy sufficient for an autonomous vehicle to model a surrounding environment, identify the position, orientation, and kinematic properties of one or more features in a surrounding environment, identify the pose of the vehicle, and navigate around, between, through, over, or under one or more features in a surrounding environment as the vehicle moves through the surrounding environment. A level of accuracy may correspond to how much a measured value on the map (e.g., a position, distance, or feature dimensions) may deviate from a true value in the surrounding environment.

In some embodiments, localization may involve the implementation of an algorithm(s) to estimate a vehicle's location in and/or movement through an environment (e.g., through feature matching) with an error of less than a set threshold (e.g., 10 centimeters (cm)). In some cases, an autonomous vehicle may build an HD map to assist the vehicle's controller with anticipating upcoming road features and planning the vehicle's motion around them. An HD map may be a local map that models a surrounding environment and one or more features in the surrounding environment with a level of accuracy sufficient for the vehicle to identify the position, orientation, and kinematic properties of one or more features in a surrounding environment, identify the pose of the vehicle relative to the one or more features, and navigate around, between, through, over, or under the one or more features as the vehicle moves through the surrounding environment. In some embodiments, an HD map may be a map that models the positions, orientations, dimensions, and kinematic properties of one or more features in a surrounding environment and the pose of the vehicle relative to the one or more features with a level of accuracy sufficient for the vehicle to navigate around, between, through, over, or under the one or more features as the vehicle moves through the surrounding environment. In some cases, an HD map may have a level of accuracy of at least about 20 cm, 15 cm, 10 cm, 5 cm, 1 cm, or greater. In some embodiments, global navigation satellite system (GNSS) data and Inertial Measurement Unit (IMU) data may be combined with data collected from other sensors on the vehicle, such as wheel encoders, lidar, SAR, and/or cameras, to provide the level of accuracy necessary for the vehicle to generate a map of a surrounding environment and one or more features in the surrounding environment, localize itself on the map, and navigate around, between, through, over, or under one or more features in the surrounding environment as the vehicle moves through the surrounding environment.

The SAR-based systems disclosed herein may be configured to perform mapping and/or localization. The SAR-based systems disclosed herein may or may not be a SLAM system. Mapping may involve generating one or more maps using the position, orientation, and kinematic properties of one or more features in the surrounding environment and/or the pose of the autonomous vehicle. The pose of the autonomous vehicle may be determined based on a movement of the autonomous vehicle through a surrounding environment. A movement of the autonomous vehicle may include a change in a pose of the autonomous vehicle. In some cases, a change in pose may include a change in position, orientation, linear velocity, angular velocity, or acceleration of the autonomous vehicle. Localization may involve using one or more maps and one or more processors or controllers onboard the vehicle or off-site on a server to determine the pose of the vehicle on a map based on a movement of the vehicle through a surrounding environment. In some cases, mapping may be performed offline. Offline mapping may involve generating one or more maps offline without using data captured in real-time. Alternatively, offline mapping may involve generating one or more maps offline using data previously collected by one or more sensors or instruments (e.g., GNSS, IMU, wheel encoders, lidar, SAR and/or cameras) on the vehicle. In some cases, offline mapping may involve generating one or more maps using maps or map data retrieved from an external database. In other cases, offline mapping may involve generating one or more maps using historical data corresponding to a previous movement of the vehicle through a portion of the surrounding environment that the vehicle has already traversed. In other cases, mapping may be performed online. Online mapping may involve generating one or more maps using data captured and/or updated in real-time as the vehicle moves through the surrounding environment. In some embodiments, localization may be performed online using data captured and/or updated in real-time. In such cases, localization may be performed using online maps generated in real time as the vehicle is moving through the surrounding environment. In other embodiments, localization may be performed online and/or offline using one or more maps generated online and/or offline, or using a combination of maps generated online and maps generated offline. In some cases, mapping may be performed offline and localization may be performed online. In other cases, mapping may be performed online and localization may be performed online. In some embodiments, one or more SAR-based systems may be implemented on a plurality of vehicles comprising one or more vehicles. In some cases, the one or more SAR-based systems may perform online and/or offline mapping using the pose of each of the one or more vehicles of the plurality of vehicles. The pose of each of the one or more vehicles may be determined based on the movement of the plurality of vehicles through a surrounding environment. In other cases, the one or more SAR-based systems may perform localization using the pose of each of the one or more vehicles of the plurality of vehicles.

In some cases, one or more SAR-based systems may be mounted on a vehicle. In other cases, the one or more SAR-based systems may be mounted on a plurality of vehicles comprising one or more vehicles. In some embodiments, the one or more SAR-based systems may be a SAR-based SLAM system. In some cases, the SAR-based SLAM system may be configured to perform simultaneous localization and mapping. Simultaneous localization and mapping may involve using the one or more SAR-based systems to perform online mapping and online localization simultaneously. In some cases, simultaneous localization and mapping may involve using real-time pose data (e.g., position data, orientation data, and kinematic data) captured by each of the one or more vehicles of the plurality of vehicles as the plurality of vehicles move through the surrounding environment. The SAR-based systems disclosed herein may enable accurate measurement and tracking of a vehicle position with an HD map generated from data collected from the surrounding environment. The SAR-based systems as disclosed herein may also operate more reliably than target detection systems based on lidar, which may experience degradation of image resolution in adverse weather (rain, fog, snow) or during nighttime. In some embodiments, the SAR-based systems described herein may include a set of transmitting and receiving radar antennas; a sensor, such as a GNSS receiver, IMU, or wheel encoder, which measures the vehicle's pose; and a controller to create an HD map using a SAR image. The radar antennas and/or the SAR-based systems can be mounted facing the side of a vehicle, front/back, or squinted.

The SAR-based system can be implemented using a radar, such as a synthetic aperture radar (SAR), that is adapted for use on, for example, terrestrial vehicles. Alternatively, the radar may incorporate one or more elements of a SAR. A SAR-based system may employ a SAR to accurately measure and track a vehicle position. The SAR employed by the SAR-based system can provide high-resolution radar imagery from a moving terrestrial platform or terrestrial vehicle. The SAR may operate similarly to a phased array radar system, but instead of using many parallel antenna elements, the SAR may use one or more antennas to combine multiple raw radar returns received at different vehicle positions into coherent focused images. In some cases, the SAR may be configured to achieve high-resolution imagery based on a wavelength of a radar signal.

FIG. 1A depicts an example of a SAR-based system 100 that may be used on a vehicle 104 for mapping and localization in a surrounding environment 101. The system 100 may be mounted to any side of the vehicle 104, or to one or more sides of the vehicle 104, e.g. a front side, rear side, lateral side, top side, or bottom side of the vehicle 104. The front side of the vehicle 104 may be the side that is facing a general direction of travel of the vehicle 104; while a rear (or back) side may be the side that is not facing the general direction of travel of the vehicle 104. The rear side of the vehicle 104 may be opposite to the front side. The front side of the vehicle 104 may point toward a forward direction of travel of the vehicle 104. The rear side of the vehicle 104 may point towards a rear direction of travel (e.g. reverse) of the vehicle 104. The lateral side may include a left side and/or a right side of the vehicle 104. The vehicle 104 may or may not be configured to move or translate orthogonally to the lateral sides of the vehicle 104. In some cases, the system disclosed herein may be mounted between two adjacent sides of the vehicle 104. The SAR-based system 100 may be oriented to detect a number of features or objects 102 in the surrounding environment 101. Such features 102 may be in front of the vehicle 104, behind the vehicle 104, or to the lateral sides of the vehicle 104.

The vehicle 104 may be a self-driving or autonomous vehicle. The vehicle 104 may be operated by a living subject, such as an animal (e.g. a human). The vehicle 104 may be stationary, moving, or capable of movement. The vehicle 104 may be any suitable terrestrial vehicle, aerial vehicle, aquatic vehicle. A terrestrial vehicle may be a motor vehicle or any other vehicle that uses a source of energy, renewable or nonrenewable (e.g., solar, thermal, electrical, wind, petroleum, etc.), to move across or in close proximity to the ground, such as, for example, within 1 meter, 2 meters, 3 meters of the ground. An aerial vehicle may be a motor vehicle or any other vehicle that uses a source of energy, renewable or nonrenewable, (solar, thermal, electrical, wind, petroleum, etc.) to move through the air or through space. An aquatic vehicle may be a motor vehicle or any other vehicle that uses a source of energy, renewable or nonrenewable, (solar, thermal, electrical, wind, petroleum, etc.) to move across or through water.

In some embodiments, the vehicle 104 may be a land-bound vehicle and travel over land. Alternatively or in addition, the vehicle 104 may be capable of traveling on or in water, underground, in the air, and/or in space. The vehicle 104 may be an automobile. The vehicle 104 may be a land-bound vehicle, watercraft, aircraft, and/or spacecraft. The vehicle 104 may travel freely over a surface. The vehicle 104 may travel freely within two or more dimensions. The vehicle may primarily drive on one or more roads. In some cases, a vehicle as described herein may be capable of operating in the air or in space. For example, the vehicle may be a plane or a helicopter.

In some embodiments, the vehicle 104 is an unmanned vehicle and operates without requiring a human operator. In some embodiments, the vehicle 104 may have no passenger or operator on-board. In some embodiments, the vehicle 104 includes a space within which a passenger may ride. In some embodiments, the vehicle 104 includes a space for cargo or objects. In some embodiments, the vehicle 104 includes tools that permit the vehicle 104 to interact with the environment (e.g., collect samples, move objects, and so forth). In some embodiments, the vehicle 104 includes tools that emit objects to the surrounding environment 101 (e.g., light, sound, liquids, pesticides, and so forth).

In some embodiments, the vehicle 104 may permit one or more passengers to ride on-board. The vehicle 104 may comprise a space for one or more passengers to ride the vehicle. The vehicle 104 may have an interior cabin with space for one or more passengers. The vehicle 104 may have a space for a driver of the vehicle 104. In some embodiments, the vehicle 104 may be capable of being driven by a human operator. Alternatively or in addition, the vehicle 104 may be operated using an autonomous driving system.

In some embodiments, the vehicle 104 may switch between a manual driving mode during which a human driver may drive the vehicle 104, and an autonomous driving mode during which an automated controller may generate signals that operate the vehicle 104 without requiring intervention of the human driver. In some embodiments, the vehicle 104 may provide driver assistance where the driver may primarily manually drive the vehicle 104, but the vehicle may execute certain automated procedures or assist the driver with performing certain procedures (e.g., lane changes, merging, parking, auto-braking). In some embodiments, the vehicle 104 may have a default operation mode. For example, the manual driving mode may be a default operation mode, or an autonomous driving mode may be a default operation mode.

Figure 1B:
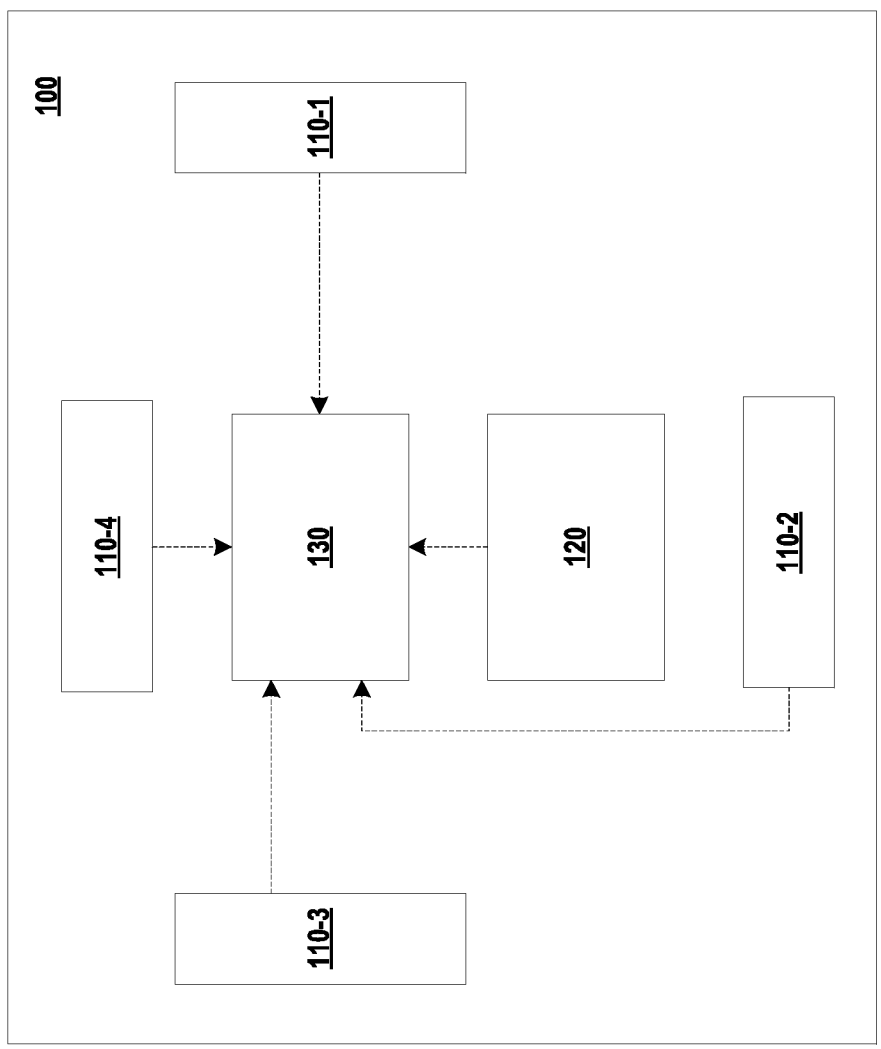
FIG. 1B depicts a controller operatively coupled to a vehicle position sensor and one or more radar antenna arrays, in accordance with some embodiments.

FIG. 1B depicts an embodiment of an example SAR-based system 100. The example SAR-based system 100 may include one or more radar antenna arrays 110, which are depicted as radar antenna arrays 110-1, 110-2, 110-3, and 110-4; a vehicle position sensor 120; and a controller 130. The controller 130 may be operatively coupled to the one or more radar antenna arrays 110 and the vehicle position sensor 120.

Figure 2:
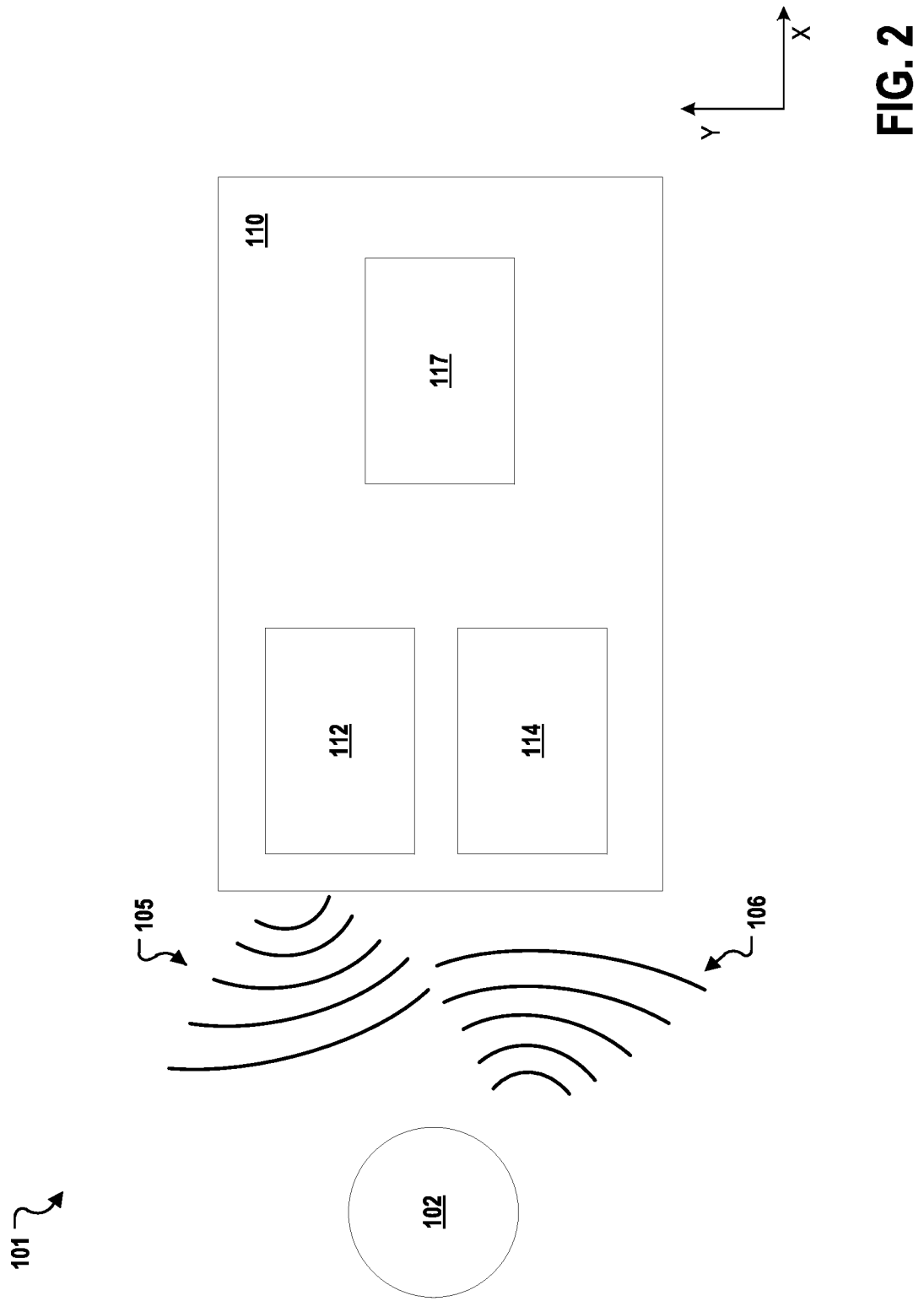
FIG. 2 depicts a radar antenna array, in accordance with some embodiments.

FIG. 2 depicts an example embodiment of a radar antenna array 110. As depicted, the example embodiment of the radar antenna array 110 may include a transmitting antenna 112, a receiving antenna 114, and a radar antenna array clock 117. In some embodiments, the radar antenna array 110 may include one or more transmitting antennas 112 and/or one or more receiving antennas 114. The radar antenna array 110 may be used to detect features, such as features 102 depicted in FIG. 1, as the vehicle moves through the surrounding environment 101.

The example radar antenna array 110 may include any one or more elements of a conventional radar system, a phased array radar system, an AESA (Active Electronically Scanned Array) radar system, a SAR system, a Multiple-Input Multiple-Output (MIMO) radar system, or a phased-MIMO radar system. A conventional radar system may include a radar system that uses radio waves transmitted by a transmitting antenna, such as transmitting antenna 112, and received by a receiving antenna, such as receiving antenna 114, to detect objects. A phased array radar system may include a radar system that manipulates the phase of one or more radio waves transmitted by a transmitting and receiving module and uses a pattern of constructive and destructive interference created by the radio waves transmitted with different phases to steer a beam of radio waves in a desired direction. An AESA radar system may include a phased array radar system that uses one or more transmitting and receiving modules to produce one or more beams of radio waves at different phases and/or frequencies. A SAR system may include a phased array radar system that uses one or more antennas to combine multiple raw radar returns received at different vehicle positions into coherent focused images. A MIMO radar system includes a radar system that uses multiple transmitting antennas to transmit a signal independently of other transmitting antennas. A phased-MIMO radar system includes a radar system comprising one or more components or features of a phased array radar system or a MIMO radar system. The radar antenna array 110 may be configured to be mounted to a front side, rear side, or lateral side of a vehicle, such as vehicle 104 depicted in FIG. 1.

The transmitting antenna 112 of the SAR-based system may be any antenna (dipole, directional, patch, sector, Yagi, parabolic, grid) that can convert electrical signals into electromagnetic waves and transmit the electromagnetic waves. In some embodiments, the transmitting antenna 112 is employed to transmit a first set of signals 105 (e.g., one or more radar pulses). A radar pulse may include any electromagnetic wave transmitted by the transmitting antenna within a frequency range of about 1 Hertz (Hz) to about 300 GigaHertz (GHz). As illustrated in FIG. 2, the one or more radar pulses may be a first set of signals 105 (e.g., successive radar pulses) transmitted repeatedly by transmitting antenna 112 at a pre-defined frequency.

The successive radar pulses generating the first set of signals 105 may have a center frequency. A center frequency may be an arithmetic or geometric mean of a lower and upper cutoff frequency of a radar system. A cutoff frequency may be an upper or lower boundary in a radar system's frequency response at which signal attenuation begins to increase rapidly. The cutoff frequency may be defined as the frequency at which the ratio of power output to power input has a magnitude of about 0.50. The successive radar pulses may have a wavelength associated with the center frequency of the successive radar pulses transmitted by the transmitting antenna 112.

The successive radar pulses generating the first set of signals 105 may be transmitted at a pre-defined frequency equal to a pulse repetition frequency. A pulse repetition frequency may be a rate at which the transmitting antennas 112 repeatedly transmit the successive radar pulses. The pulse repetition frequency may be less than or equal to 9 KHz. The pulse repetition frequency may be greater than 9 KHz. The pulse repetition frequency may be at least about 1 KHz, 2 KHz, 3 KHz, 4 KHz, 5 KHz, 6 KHz, 7 KHz, 8, KHz, 9 KHz, or any value between 1 KHz and 9 KHz. In some embodiments, the pulse repetition frequency may preferably range from about 7 KHz to about 9 KHz. The pulse repetition frequency of the radar system may be designed based on maximum vehicle speed. The pulse repetition frequency may be designed so that the time between successive radar pulses corresponds to a vehicle travel distance that is less than a value S. S may be less than 1.5 millimeter (mm) or greater than 2 mm. S may be equal to 1.5 mm or equal to 2 mm. S may be greater than or equal to 1.5 mm. S may be less than or equal to 2 mm. S may be at least about 1.5 mm, 1.6 mm, 1.7 mm, 1.8 mm, 1.9 mm, 2 mm, or any value between 1.5 mm and 2 mm. In some cases, S may be equal to about one-half of the wavelength corresponding to the center frequency of the successive radar pulses.

The receiving antenna 114 of the SAR-based system may be any antenna (dipole, directional, patch, sector, Yagi, parabolic, grid) that can receive electromagnetic waves and convert the radiofrequency radiation waves into electrical signals. As illustrated in FIG. 2, the receiving antenna 114 may be used to receive a second set of signals 106 (e.g., a subset of the successive radar pulses that are transmitted by the transmitting antenna 112 and reflected back to the receiving antenna after interacting with external targets). In some embodiments, the receiving antenna 114 may be used to receive a subset of the successive radar pulses that are transmitted the transmitting antenna 112 and reflected back to receiving antenna 114 after interacting with external targets.

The radar antenna array clock 117 may be a real time clock or a system clock. A real-time clock includes a clock that keeps track of time when a system is turned off. A real-time clock may be a hardware-implemented clock. A real time clock may be battery-powered. A system clock may be software-implemented clock. A system clock may be based on the frequency of a processor. In other embodiments, the radar antenna array clock 117 may be a common clock or an independent clock. A common clock includes a clock that provides a common time to one or more components in a system. An independent clock includes a clock that provides time information for data derived independently from one or more components or subcomponents in a system.

Figure 3:
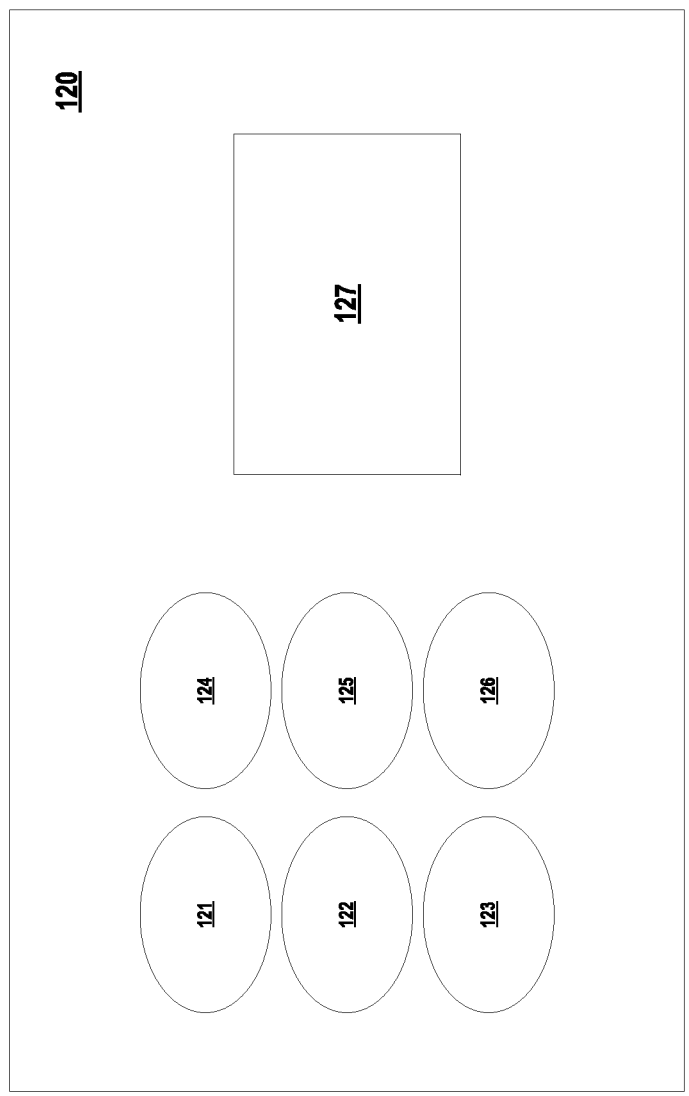
FIG. 3 depicts a vehicle position sensor, in accordance with some embodiments.

FIG. 3 depicts an example embodiment of the vehicle position sensor 120. The vehicle position sensor 120 may include any sensor that can obtain the spatial disposition of a vehicle, such as vehicle 104 depicted in FIG. 1. As depicted, the vehicle position sensor 120 may include a global navigation satellite system (GNSS) receiver 121 (e.g., a global positioning system (GPS) sensor); an IMU 122; a camera 123; a lidar 124; a radar 125; and/or a wheel encoder 126. The position sensors 120 may include any other sensor that may be used to monitor the position of a moving object, such as location sensors (e.g., mobile device transmitters enabling location triangulation), vision sensors (e.g., imaging devices capable of detecting visible, infrared, or ultraviolet light, such as cameras), proximity or range sensors (e.g., ultrasonic sensors, time-of-flight or depth cameras), inertial sensors (e.g., accelerometers, gyroscopes), altitude sensors, attitude sensors (e.g., compasses), pressure sensors (e.g., barometers), audio sensors (e.g., microphones) or field sensors (e.g., magnetometers, electromagnetic sensors).

In some embodiments, the vehicle position sensor 120 may be located onboard a vehicle, such as vehicle 104 depicted in FIG. 1, and situated separately from a radar antenna array, as depicted in FIG. 2. The vehicle position sensor 120 may include a vehicle position sensor clock 127. In some embodiments, the vehicle position sensor clock 127 may be a real time clock or a system clock. In other embodiments, the vehicle position sensor clock 127 may be a common clock or an independent clock.

Figure 4:
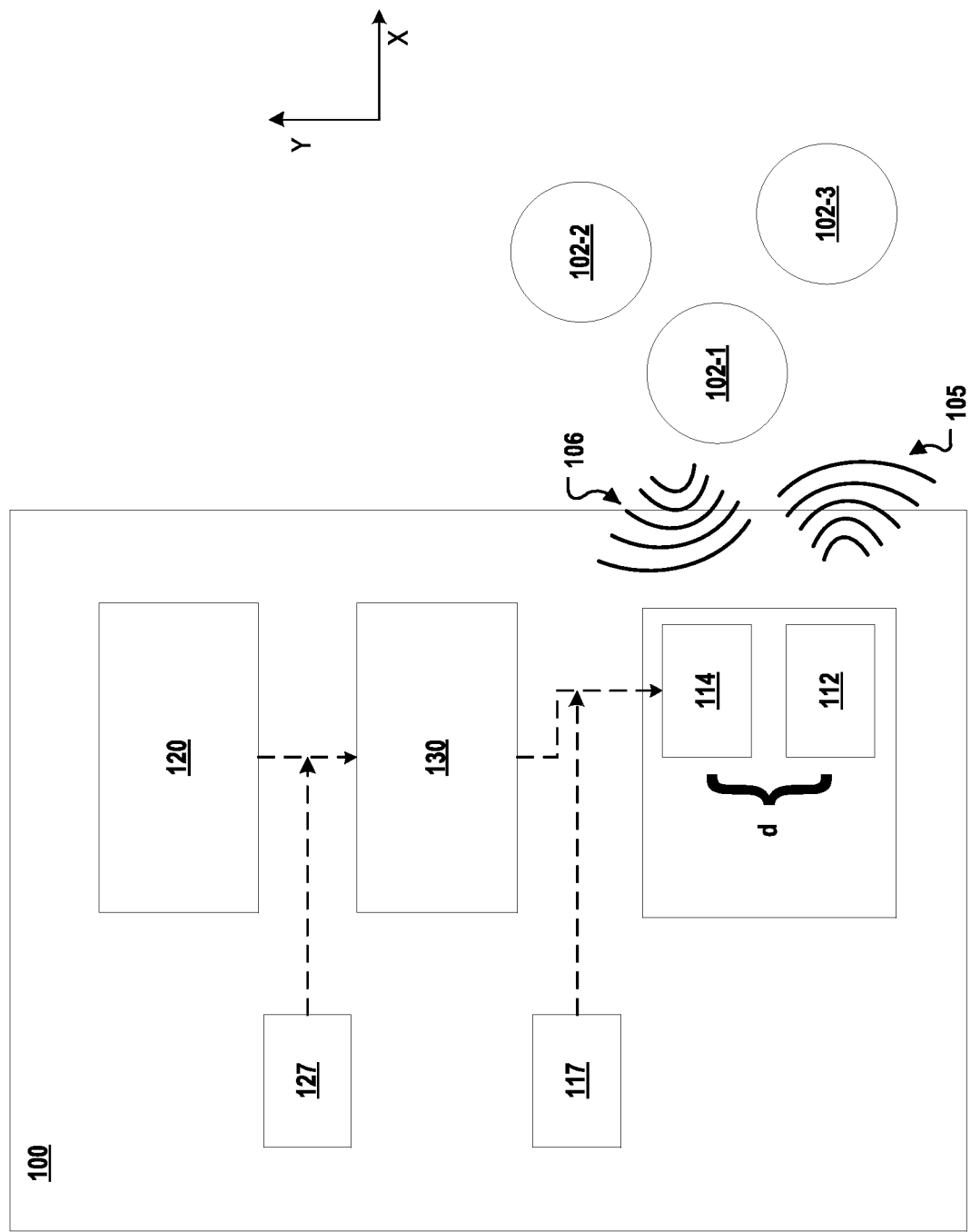
FIG. 4 depicts a system that can use a controller to synchronize measurements taken from a vehicle position sensor and a radar antenna array, in accordance with some embodiments.

FIG. 4 shows an example embodiment of the SAR-based system 100. As depicted, the controller 130 is operatively coupled to the radar antenna array 110 and the vehicle position sensor 120. The controller 130 may be used to synchronize measurements taken by the system 100 and to perform mapping and localization operations. The controller 130 may be implemented onboard a vehicle, such as the vehicle 104 depicted in FIG. 1, or off-site on a server (See FIG. 5). The controller 130 may include, for example, a computer processor, application specific integrated circuit, a graphics processing unit, or a field programmable gate array.

In some embodiments, the controller 130 may be configured to obtain a first set of measurements from the radar antenna array 110 of the SAR-based system 100. As illustrated in FIG. 4, the first set of measurements may be based on the first set of signals 105 (e.g., successive radar pulses) transmitted by the transmitting antenna 112 and the second set of signals 106 received by the receiving antenna 114. The plurality of signals received by the receiving antenna 114 may include a subset of the successive radar pulses that are transmitted by the transmitting antenna 112 and reflected back to the receiving antenna 114 after interacting with external features 102-1, 102-2, 102-3. The controller 130 can also be configured to obtain a second set of measurements from the vehicle position sensor 120. The second set of measurements may include information on the spatial disposition of the vehicle. The vehicle position sensor 120 may obtain a spatial disposition of the vehicle in real-time. The vehicle may be stationary or in motion. The controller 120 may also be configured to synchronize the first set of measurements with the second set of measurements using the radar antenna array clock 117 and the vehicle position sensor clock 127 to generate a set of synchronized measurements. The controller 120 may be further configured to use the synchronized measurements to determine a spatial disposition of a feature or a characteristic of a feature.

In one embodiment, synchronization may be achieved by a common clock that may be provided to both the radar antenna array 110 of the SAR-based system 100 and the position sensor 120. In the described embodiment, each sensor may derive its own sampling frequency as a multiple of this clock, so that the relative timing is known based on the nominal sampling frequencies.

In another embodiment, synchronization may be achieved by a common clock that may be provided to both the radar and positioning sensor. Each sensor may sample data independently, but may calculate a timestamp or index for each sample relative to the shared clock. In a further embodiment, each sensor may be equipped with its own independent clock source. Each sensor may use the shared clock as a coarse time reference, and its own clock as a fine time reference. In a further embodiment, the independent clock may be compared to the shared clock and its frequency may be compensated or adjusted based on the nominal frequency of the common clock.

In some embodiments, synchronization may be achieved by a GNSS receiver that can generate a reference clock signal with a predetermined output rate. The predetermined output rate may be one pulse-per-second (PPS) or a different output rate. The reference clock signal may be provided to a positioning sensor and/or a radar sensor. The GNSS receiver may be collocated and integrated with the positioning sensor and/or radar sensor, or separate. The GNSS clock signal may function as the common clock described in previous embodiments.

In other embodiments, synchronization may be achieved by a radar system that can generate a radar clock signal that is provided to the position sensor 120 or GNSS receiver. The radar clock signal may be approximately equal to the sampling frequency of the radar system. The GNSS receiver may generate its measurements synchronously with the radar clock signal. In one embodiment, synchronization may be achieved by a GNSS receiver that can provide both a clock signal as well as absolute GNSS timestamps over a data channel. The radar and/or the position sensor 120 may operate as in previous embodiments, but may additionally use the absolute GNSS timestamps to compute the absolute time of their measurements.

In one embodiment, synchronization may be achieved by a radar sensor that can use a higher-frequency clock to provide fine timing information in addition to the coarse timing information from the GNSS receiver. In another embodiment, synchronization may be achieved by compensating or adjusting the frequency of the radar's independent clock based on the coarse timing information received from the GNSS receiver.

In some cases, synchronization may be achieved by using phase shift measurements to determine changes in vehicle position or target position. Phase measurements may be measurements of the difference in phase between a first signal transmitted by the transmitting antenna 112 and a second signal received by the receiving antenna 114. The second signal may be a subset of the first signal reflected off a target after the first signal interacts with the target. Alternatively, synchronization may be achieved through any combination of the synchronization methods described herein.

In some embodiments, the controller 130 may be configured to control the pulse repetition frequency of successive radar pulses transmitted by the transmitting antenna 112. The pulse repetition frequency may be approximately equal to the inverse of the time duration for the vehicle 104 to travel a fraction of the wavelength of the transmitted radar pulses. The wavelength of the transmitted radar pulse may range from 3 mm to 4 mm. The wavelength of the transmitted radar pulse may be less than or equal to 3 mm. The wavelength of the transmitted radar pulse may be greater than or equal to 4 mm. A fraction of the wavelength may be less than or equal to about 1, 0.75, 0.67, 0.5, 0.33, 0.25, 0.2, or 0.1 of the wavelength. In some cases, a fraction of the wavelength described herein may be greater than 1. For example, a fraction of the wavelength may be at least about 1.25, 1.5, 1.75, 2, 3, 4, 5, 6, 7, 8, 9, or 10 times the wavelength.

In some embodiments, the controller 130 may also be configured to pre-process signals received from the transmitting antenna 112, the receiving antenna 114, or the position sensor 120 to reduce the bandwidth of received signals before calculating the spatial disposition or characteristic of an external target. Pre-processing can include peak-detection methods, Fourier transform methods, filtering methods, smoothing methods, or any other methods that are used to modify or transform a signal.

In some embodiments, the controller 130 may be configured to synchronize signals that are received from the transmitting antenna 112, the receiving antenna 114, or the position sensor 120. In such embodiments, that signals are synchronized either relative to each other or relative to an absolute time, using one or more clocks, such has the radar antenna array clock 117 and/or the vehicle position sensor clock 127. In some embodiments, the controller 130 may be configured to calculate a spatial disposition or characteristic of each of the features 120 external to the vehicle 104. Such data may be used by the SAR-based system 100 to generate an HD map.

In any of the embodiments described herein, the system may comprise a SAR-based system. The SAR-based system may be used to collect or receive a subset of the successive radar pulses that are transmitted by the transmitting antenna and reflected back to the receiving antenna after interacting with external targets. The subset of successive radar pulses collected or received may be used to determine a characteristic or spatial disposition of a target relative to the vehicle 104. The SAR-based system may be located onboard the vehicle 104, on the front, rear, sides, top, or bottom.

The SAR may have an azimuth resolution less than about 0.05° or an azimuth resolution greater than about 1°. The SAR may have an azimuth resolution that is about 0.05°, 0.06°, 0.07°, 0.08°, 0.09°, or 1°, or any value in between 0.05° and 1°.

The synthetic aperture SAR radar may have an elevation resolution less than about 2.5° or an elevation resolution greater than about 10°. The synthetic SAR aperture radar may have an elevation resolution that is about 2.5°, 3.0°, 3.5°, 4.0°, 4.5°, 5.0°, 5.5°, 6.0°, 6.5°, 7.0°, 7.5°, 8.0°, 8.5°, 9.0°, 9.5°, or 10°, or any value in between 2.5° and 10°.

The SAR may have an elevation resolution less than about 5° or an elevation resolution greater than about 30°. The SAR may have an elevation resolution that is about 5°, 10°, 15°, 20°, 25°, or 30°, or any value in between 5° and 30°.

In some embodiments, the SAR-based system 100 may operate in a "mapping mode" during which high-resolution SAR data is collected from a SAR while the vehicle 104 drives through an area of interest, such as a surrounding environment 101. In some embodiments, the SAR-based system 100 may employ sensors, such as real-time kinematic (RTK) position sensors, GNSS receivers, and/or wheel encoders, to determine the location of the vehicle 104 with the environment 101 to a high degree of accuracy (e.g., within 3 cm, 10 cm, or some other threshold value). In some embodiments, additional radar sensors can be mounted to cover a larger field of view and to collect redundant data while in mapping mode.

In some embodiments, the SAR-based system 100 may refine the pose of the vehicle using data collected by the SAR-based system. In some embodiments, in order to achieve higher accuracy, the vehicle's 104 pose can be regressed using consecutive SAR images along a collection path as the vehicle moves through the environment 101. Moreover, in some embodiments, the vehicle's 104 pose at intersections (e.g., from two different consecutive road segments) can be regressed (a problem commonly known as loop closure). Such a refinement process can be augmented with additional sensors, such as lidar, a vehicle position sensor, and/or a camera.

In some embodiments, the SAR-based system may extract stable features from SAR images. Such stable features may include features that do not change with viewing angle, distance, and so forth. These stable features can be high-level features, such as poles, and curbs, or lower level features that are composed of characteristics of a scene, such as corners of buildings or tree trunks. In some embodiments, the features' description, together with their geographical coordinates, may be collected and stored. This data set can be augmented with maps generated from other sensors, such as cameras and lidar.

In some embodiments, the SAR-based system 100 may be employed to generate an HD map. For example, the SAR-based system 100 may transmit a first set of signals 105, such as successive radar pulses, to the surrounding environment 101 and collect a second set of signals 106, from said the surrounding environment 101 while the vehicle 104 is in motion. The second set of signals 106 may be generated when the first set of signals 105 is transmitted by a transmitting antenna 112 and a subset of the first set of signals 105 is reflected back to a receiving antenna 114 after interacting with at least one object or feature in a surrounding environment. In such examples, the second set of signals may be processed by the SAR-based system 100 with aid of the controller 130 to generate the HD map of the surrounding environment 101. Processing the second set of signals may involve using one or more elements of one or more SLAM algorithms (e.g., Extended Kalman Filter SLAM, FastSLAM, L-SLAM, GraphSLAM, Occupancy Grid SLAM, DP-SLAM, Parallel Tracking and Mapping, LSD-SLAM, S-PTAM, ORB-SLAM, MonoSLAM, CoSLAM, SeqSLAM, or Incremental Smoothing and Mapping) to generate a map of a surrounding environment based on the pose (e.g., the position, orientation, and/or kinematic properties) of the vehicle, which may be determined from the second set of signals received by the SAR-based system. In some embodiments, the HD map may be stored to memory (See FIG. 6). In some embodiments, the HD map may include a pose of the vehicle 104 within the surrounding environment 101. Such a pose may include, for example, the position, orientation, and kinematic properties (e.g., linear velocity, angular velocity, or acceleration) of the vehicle 104. In some cases, the pose of the vehicle may be refined or updated with the aid of a SAR unit and a controller based on a movement of the vehicle and/or a movement of a plurality of vehicles through the surrounding environment. A movement of the vehicle may include a change in the pose of the vehicle. Refining or updating the pose of the vehicle may involve regressing the pose of the vehicle using a plurality of SAR-based images generated by the SAR-based system based on a movement of the vehicle or the plurality of vehicles through a surrounding environment. Regressing may involve the use of one or more elements of one or more regression techniques (e.g., linear regression, logistic regression, polynomial regression, stepwise regression, ridge regression, lasso regression, elasticNet regression, principal component regression, partial least square regression, support vector regression, ordinal regression, poisson regression, quasi-poisson regression, negative binomial regression, cox regression, etc.) to predict or estimate a change in the pose of the vehicle. In some embodiments, the HD map may include a SAR-based image showing a plurality of features located within the surrounding environment. In some embodiments, the plurality of features may have a location accuracy of within less than about 10 centimeters on the map.

In some embodiments, the HD map may be a SAR-based image that includes one or more features 102 that are located within the surrounding environment 101. In such embodiments, the location of the features 102 in the HD map accuracy less than a set threshold (e.g., 3 cm, 10 cm, and so forth).

In some embodiments, the second set of signals may be generated upon the first set of signals interacting with the feature 102 in the surrounding environment 101. In some embodiments, the vehicle position sensor 120 may collect a third set of signals while the vehicle 104 is in motion. The third set of signals may include measurements of the pose (e.g., the position, orientation, linear velocity, angular velocity, and/or acceleration) of the vehicle 104. In some cases, a GNSS system (e.g., a GPS system) may be used to provide estimates of the velocity and/or acceleration of the vehicle based on a movement of the vehicle through a surrounding environment.

In some embodiments, both the second and the third set of signals may be processed by the SAR-based system 100 with the aid of the controller 130 to generate the HD map of the surrounding environment 101. Processing the second and third set of signals may involve using one or more elements of one or more SLAM algorithms (e.g., Extended Kalman Filter SLAM, FastSLAM, L-SLAM, GraphSLAM, Occupancy Grid SLAM, DP-SLAM, Parallel Tracking and Mapping, LSD-SLAM, S-PTAM, ORB-SLAM, Mono-SLAM, CoSLAM, SeqSLAM, or Incremental Smoothing and Mapping) to generate an HD map of a surrounding environment based on the pose of the vehicle, which may be determined from the second and third set of signals received by the SAR-based system. In some embodiments, the HD map may include a first map generated by the SAR-based system 100 that is augmented with a second map that is generated by the vehicle position sensor 120. In some embodiments, the pose of the vehicle 104 may be computed by the SAR-based system 100 by comparing a first set of features, such as features 102, in the first map with a second set of features, such as features 102, in the second map.

In some embodiments, based on a movement of the vehicle 104 through the surrounding environment 101, the pose of the vehicle 104 within the HD map may be refined or updated by the SAR-based system 100 with the aid of the controller 130 and the position sensor 120. In some embodiments, refining or updating of the pose of the vehicle 104 within the HD map may include regressing the pose using a plurality of SAR-based image(s) generated by the SAR-based system 100 based on a movement of the vehicle 104 through the surrounding environment 101. In some embodiments, refining or updating of the pose of the vehicle 104 within the HD map may include employing SAR-based velocity estimates by the SAR-based system 100, which is an advantage over lidar-based mapping systems. In some embodiments, the SAR-based system may be configured to generate a tracklog as the vehicle moves through the surrounding environment. The tracklog may include a series of timestamped estimates of the pose (e.g., the position, orientation, linear velocity, angular velocity, and/or acceleration) of the vehicle and/or the position, orientation, and kinematic properties of one or more features in the surrounding environment. The series of timestamped estimates may be generated sequentially as the vehicle moves through the surrounding environment. The series of timestamped estimates may include one or more error estimates associated with the timestamped estimates. In some cases, the tracklog may include one or more data sets collected from each of one or more sensors or instruments (e.g., GNSS, IMU, camera, radar, SAR, LIDAR, Controller Area Network (CAN) bus, vehicle position sensor, etc.) located onboard the vehicle. The one or more data sets in the tracklog may be compiled and/or collected by each of the one or more sensors or instruments located onboard the vehicle during a pre-determined time interval. The one or more data sets in the tracklog may include multiple sets of measurements (e.g., measurements of the pose of the vehicle and measurements of the kinematic properties of the vehicle) taken separately by each of the one or more sensors or instruments located onboard the vehicle. Each of the one or more sensors or instruments located onboard the vehicle may generate the one or more data sets in the tracklog while each of the one or more sensors or instruments operates at a different data acquisition rate or frequency. In some cases, the tracklog may include data corresponding to a pose of the vehicle and/or a pose of one or more vehicles of a plurality of vehicles. Pose may include position data and orientation data of the vehicle or position data and orientation data of the one or more vehicles of the plurality of vehicles. In some cases, pose may include linear velocity, acceleration, and/or angular velocity data for the vehicle or linear velocity, acceleration, and/or angular velocity data for the one or more vehicles of the plurality of vehicles. Linear velocity, acceleration, and/or angular velocity data for the vehicle and/or the one or more vehicles of the plurality of vehicles may be obtained or estimated using a GNSS system (e.g., a GPS system) and/or a vehicle position sensor. In some cases, the pose of the vehicle or the poses of the one or more vehicles of the plurality of vehicles may be determined in part based on an alignment of one or more local maps against a globally aligned regional map.

In some embodiments, a refined tracklog of the vehicle 104 may be obtained by the SAR-based system 100 based on a refined or updated pose of the vehicle or the plurality of vehicles. The refined tracklog may be generated by updating the tracklog generated by the SAR-based system based on a movement of the vehicle through the surrounding environment. A movement of the vehicle may include a change in the pose (e.g., the position, orientation, linear velocity, acceleration, and/or angular velocity) of the vehicle. The pose of the vehicle may change as the vehicle moves through the surrounding environment. In some cases, the refined tracklog may be generated by updating the tracklog based on one or more measurements (e.g., measurements of the pose of the vehicle and measurements of the kinematic properties of the vehicle) taken by one or more sensors or instruments outside of the pre-determined time interval used to generate the tracklog. In other cases, the refined tracklog may be generated by updating the tracklog with an updated pose of the vehicle. The updated pose may be a pose that is updated and/or refined based on a movement of the vehicle through the surrounding environment. The updated pose may be a pose that is updated and/or refined based on one or more measurements (e.g., measurements of the position, orientation, or kinematic properties of the vehicle) taken by one or more sensors or instruments outside of the pre-determined time interval used to generate the tracklog. The updated pose may be computed using measurements taken in real-time as the vehicle moves through the surrounding environment. Alternatively, the updated pose may be computed using historical data of the vehicle's previous movement through the surrounding environment during a pre-determined time interval. In some cases, the updated pose of the vehicle may be computed by regressing the updated pose of the vehicle using a plurality of SAR-based images generated by the SAR-based system based on a movement of the vehicle through a surrounding environment. A movement of the vehicle may include a change in the pose of the vehicle. In other cases, the updated pose of the vehicle may be computed using a plurality of SAR-based images and/or a plurality of SAR-based velocity estimates generated based on a movement of the vehicle through a surrounding environment. In some cases, the updated pose of the vehicle may be computed offline without using real-time data. In such cases, the updated pose may be computed using historical data of the vehicle's previous movement through the surrounding environment during a pre-determined time interval. In other cases, the updated pose of the vehicle may be generated offline using one or more post processing methods. Alternatively, the updated pose of the vehicle may be generated online using real-time data. In such cases, the real-time data may be generated using measurements taken by one or more sensors or instruments on the vehicle while the vehicle is moving through the surrounding environment. In some embodiments, the updated pose of the vehicle or the one or more vehicles of a plurality of vehicles may be determined in part based on an alignment of one or more local maps against a globally aligned regional map.

In some embodiments, the tracklog may be employed by the SAR-based system 100 in a feedback mode to improve a previously generated SAR-based image and/or localization match. A localization match may be a match between two or more sets of localization data. The two or more sets of localization data may include data associated with the pose of the vehicle and/or data associated with the position, orientation, and kinematic properties of any one or more features identified by the SAR-based system within the surrounding environment. The two or more sets of localization data may be derived in part from a first set of signals transmitted by a SAR-based system, a second set of signals received by a SAR-based system, and/or a third set of signals collected by a vehicle position sensor. In some cases, at least one of the two or more sets of localization data may be locally collected by the vehicle in real-time and/or may be recalled from a tracklog generated by the SAR-based system using localization data previously generated in part using a first set of signals transmitted by a SAR-based system, a second set of signals received by a SAR-based system, and/or a third set of signals collected by a vehicle position sensor. In some embodiments, the tracklog may be employed by the SAR-based system 100 in a feedforward mode to improve future tracklog estimates and SAR-based images without modifying the previously generated SAR-based image and the localization match.

Figure 5:
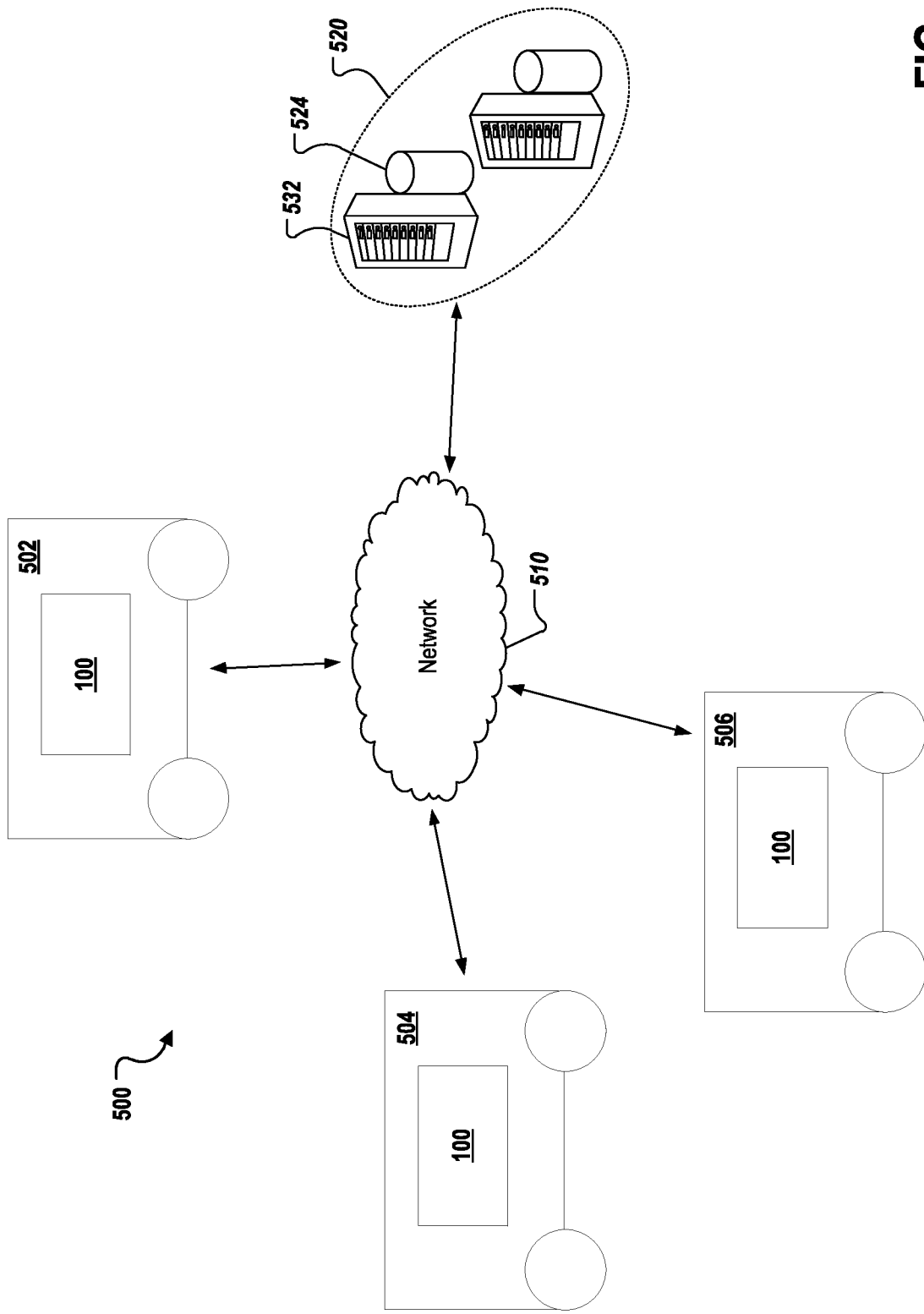
FIG. 5 depicts an example environment that can be employed to execute implementations of the present disclosure.

FIG. 5 depicts an example environment 500 that can be employed to execute implementations of the present disclosure. As depicted, the example environment 500 includes vehicles 502, 504, 506; a back-end system 520; and a network 510. Vehicles 502, 504, and 506 may be substantially similar to vehicle 104 depicted in FIG. 1 and each may employ a SAR-based system 100. Three vehicles are depicted in FIG. 5; however, such an environment may be implemented with any number of deployed vehicles.

In some embodiments, the network 510 includes a local area network (LAN), wide area network (WAN), the Internet, or a combination thereof, and connects web sites, devices (e.g., vehicles 502, 504, and 506) and back-end systems (e.g., the back-end system 520). The network 510 can be the Internet, an internet and/or extranet, or an intranet and/or extranet that is in communication with the Internet. The network 510 in some cases is a telecommunication and/or data network. In some embodiments, the network 510 may be accessed over a wired and/or a wireless communications link. For example, each of the vehicles 502, 504, and 506 may employ a mobile communication device to access the network 510 through, for example, a cellular network.

In some embodiments, the back-end system 520 includes server-class hardware type devices. In some embodiments, the back-end system 520 includes computer systems using clustered computers and components to act as a single pool of seamless resources when accessed through the network 510. For example, such embodiments may be used in data center, cloud computing, storage area network (SAN), and network attached storage (NAS) applications. In some embodiments, back-end system 520 is deployed using a virtual machine(s).

In the depicted example environment 500, the back-end system 520 includes at least one server system 532 and a least one data store 524. In some embodiments, the at least one server system 532 may host one or more computer-implemented services through which the respective SAR-based system 100 of the vehicles 502, 504, and 506 may send and receive data. For example, in some embodiments, the SAR-based systems 100 may each provide one or more local maps and/or the collected signal data, such as described previously, to the back-end system 520 through the provided computer-implemented services. In such embodiments, the back-end system 520 may generate a globally aligned regional map based on the received data. For example, the back-end system 520 may align one or more local maps to estimate local motion of the terrestrial vehicle and/or a plurality of vehicles and generate a larger globally aligned regional map. Such a process to generate a globally aligned regional map may include resolving local inconsistencies at loop closures and aligning to a reference set of global coordinates. Resolving local inconsistencies at loop closures and aligning the one or more local maps to a reference set of global coordinates may be performed for a single vehicle and/or a plurality of vehicles to generate the globally aligned regional map.

In some embodiments, the SAR-based systems 100 may each be provided with a globally aligned regional map. In some embodiments, each of the SAR-based systems 100 may operate in "localization mode." In some embodiments, as the respective vehicle moves through an environment with the respective the SAR-based systems 100 in localization mode, such as described previously, data is collected and an HD map of the local environment and the features within the environment is generated with the collected data. In some embodiments, the SAR-based systems 100 can employ the globally aligned regional map generated from one or more local maps for localization. For example, the SAR-based systems 100 may align a local HD map with the existing globally aligned regional map provided from the back-end system 520 to determine the pose of the vehicle. In such examples, the SAR-based systems 100 may match the locally collected data with features in the globally aligned regional map. Based on the match between observed and mapped features, the SAR-based systems 100 can determine the pose of the respective vehicle on the globally aligned regional map with high degree of accuracy (e.g., the lane of a road in which the vehicle is traveling, how far the vehicle is from a curb, poles, and so forth). The SAR-based systems 100 may use this information to provide advanced safety or autonomous driving features, for example.

In some embodiments, the SAR-based system 100 may be used to refine the generated HD map and localization. As described previously, initial SAR images may be used to localize the vehicle on a map, such as the received globally aligned regional map. The localization information can be used to refine the tracklog information (e.g., information on the pose of the vehicle and information on the linear velocity, acceleration, and angular velocity of the vehicle) associated with the vehicle. This refined tracklog may be employed by the SAR-based system 100 to generate more precise SAR images and HD maps. The SAR-based system 100 may perform such refining in a feedback mode, in which refined tracklogs are used to improve previously generated SAR images and localization matches, or in a feedforward mode, in which tracklog refinements are used to improve future tracklog estimates and SAR images without modifying one or more previously generated SAR-based images and/or localization results of the vehicle.

In some embodiments, map data for the globally aligned regional map generated by the back-end system 520 may be continuously updated via a plurality of mapping vehicles 502, 504, and 506. In such embodiments, the map data may be continuously accessed by the vehicles 502, 504, and 506 in localization mode using the network 510. In some embodiments, the back-end system 520 may provide an application programming interface (API) which services with each of the SAR-based systems 100 employed by vehicles 502, 504, and 506.

Another aspect of the present disclosures provides a system for generating a map. The system may comprise one or more SAR-based systems mountable to a terrestrial vehicle and one or more computer processors operatively coupled to the SAR unit. The one or more computer processors may be individually or collectively programmed to use the SAR unit while the terrestrial vehicle is in motion to transmit a first set of signals to an environment external to the terrestrial vehicle and to collect a second set of signals from the environment. The second set of signals may be generated when a first set of signals is transmitted by a transmitting antenna and a subset of the first set of signals is reflected back to a receiving antenna after interacting with at least one object or feature in a surrounding environment. The one or more computer processors may be further programmed, individually or collectively, to use at least the second set of signals to generate a map of the environment in memory. In some embodiments, the system may further comprise a terrestrial vehicle (e.g., an autonomous vehicle). The one or more SAR-based systems may be mounted on the terrestrial vehicle. In other embodiments, the system may comprise a plurality of vehicles comprising the terrestrial vehicle. In such cases, the one or more SAR-based systems may be mounted on each of the plurality of vehicles. The one or more SAR-based systems may comprise a transmitting antenna configured to transmit a first set of signals and a receiving antenna configured to receive a second set of signals. The second set of signals may be generated when the first set of signals is transmitted by the transmitting antenna and a subset of the first set of signals is reflected back to the receiving antenna after interacting with at least one object or feature in the surrounding environment. The second set of signals may comprise a plurality of second set of signals collected using the one or more SAR-based systems mounted on each of the plurality of vehicles. In some embodiments, the system may further comprise a vehicle position sensor. The vehicle position sensor may include at least one of an inertial measurement unit, a global positioning system sensor, a camera, a light detection and ranging (lidar) unit, a wheel encoder, or a radar. The vehicle position sensor may be configured to collect a third set of signals comprising position, orientation, and velocity measurements of the terrestrial vehicle while the terrestrial vehicle is in motion. In some cases, the one or more computer processors may be programmed, individually or collectively, to use at least the second set of signals and the third set of signals to generate a map of the surrounding environment in memory.

Computer Systems

Figure 6:
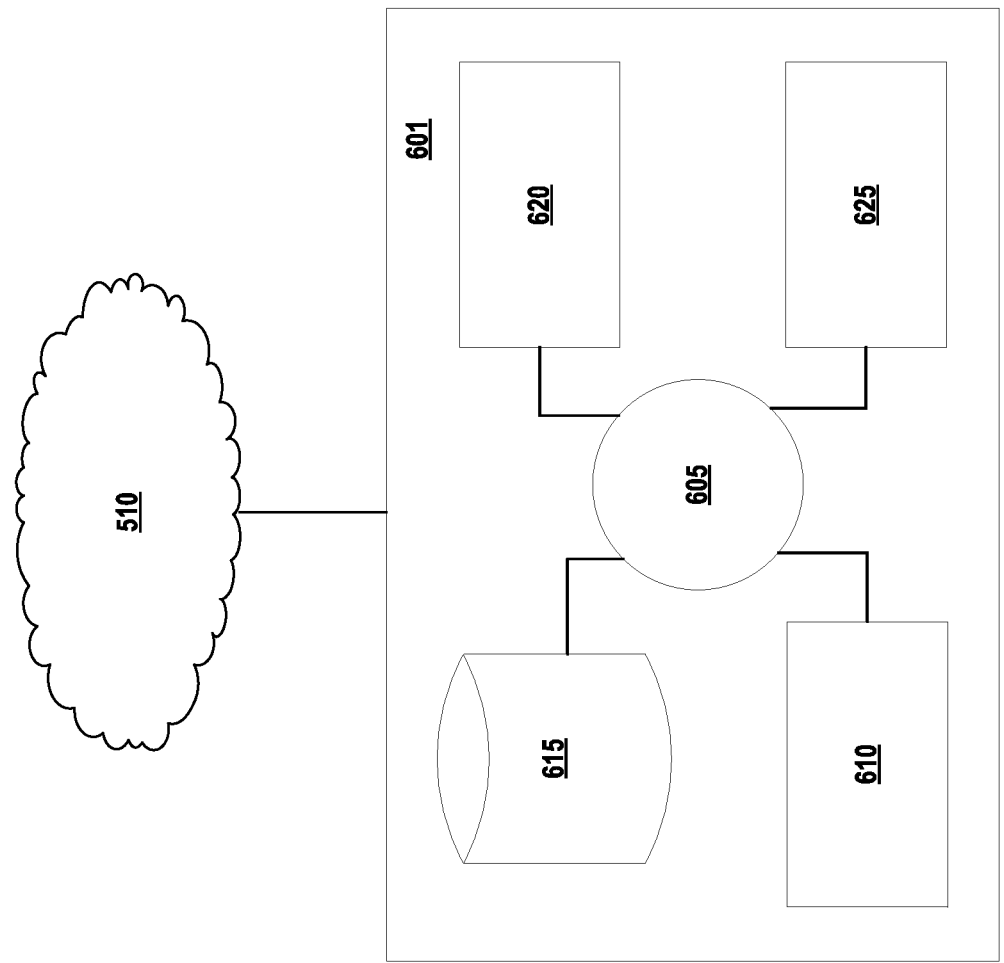
FIG. 6 depicts a computer control system that is programmed or otherwise configured to implement methods provided herein.
Figure 6:
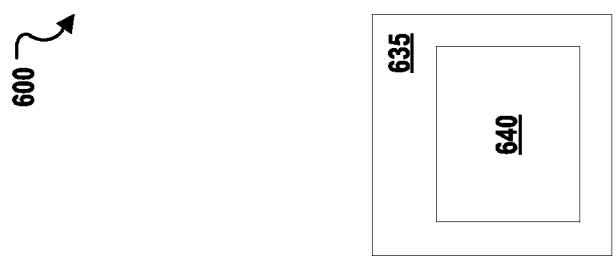

Computer control systems are provided herein that can be used to implement methods or systems of the disclosure. FIG. 6 shows a computer system 601 that is programmed or otherwise configured to implement a method for generating an HD map based on sensor data collected from sensors mounted to a vehicle. In some embodiments, the sensor data is collected from a SAR unit while the vehicle is in motion. In such embodiments, the SAR unit transmits a first set of signals to an environment external to the vehicle and collects a second set of signals from the environment. In such embodiments, the computer system 601 processes the second set of signals to generate the HD map of said environment, which is may store in memory 610. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to the computer network 510 with the aid of the communication interface 620. The network 510, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 510. For instance, the computer system 601 can communicate with a remote computer system of a user (e.g., an end user, a consumer, a publisher, a vehicle operator, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 510.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media include for example: a floppy disk, a flexible disk, hard disk, magnetic tape, any other magnetic medium, a compact disc (CD)-read only memory (ROM), DVD or digital optical disc (DVD)-ROM, any other optical medium, punch cards paper tape, any other physical storage medium with patterns of holes, a random-access memory (RAM), a ROM, a programmable ROM (PROM) and erasable PROM (EPROM), a flash-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, a portal for monitoring one or more targets detected by the system. A user can use the portal to view information relating to the spatial disposition or characteristics of one or more targets detected by the system. The portal may be provided through an API. A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm may be configured or used to implement any of the data collection, computations, or analyses described elsewhere herein.

While preferred embodiments have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for generating a map, the method being executed by an electronic processor and comprising:
   providing a pulse repetition frequency to a synthetic aperture radar (SAR) unit mounted on a terrestrial vehicle;
   transmitting, via the SAR unit, a first set of signals at the pulse repetition frequency to an environment external to the terrestrial vehicle while the terrestrial vehicle is in motion;
   receiving, via the SAR unit, a second set of signals from the environment;
   receiving, from a vehicle position sensor, a third set of signals comprising position, orientation, and velocity measurements of the terrestrial vehicle while the terrestrial vehicle is in motion;
   generating a synchronized set of signals by temporally synchronizing the second set of signals and the third set of signals, and
   generating the map of the environment based on the synchronized set of signals.

2. The method of claim 1, wherein the map comprises a local map having a plurality of features positioned relative to, and in a vicinity of the terrestrial vehicle.

3. The method of claim 2, further comprising:
   generating a plurality of local maps, wherein two or more of the plurality of local maps overlap with one another.

4. The method of claim 3, further comprising:
   generating a regional map that covers a plurality of regions within the environment by aligning the plurality of local maps to one another.

5. The method of claim 4, further comprising:
determining a local motion of the terrestrial vehicle in the environment based on the aligned plurality of local maps.

6. The method of claim 4, further comprising:
aligning one or more of the plurality of local maps with the regional map; and
determining a pose of the terrestrial vehicle based on the alignment.

7. The method of any one of claims 2 through 4, wherein the terrestrial vehicle comprises a controller comprising the electronic processor.

8. The method of claim 4, further comprising:
generating the regional map by resolving local inconsistencies at loop closures and aligning to a reference set of global coordinates of the terrestrial vehicle.

9. The method of claim 1, wherein the second set of signals are generated upon the first set of signals interacting with at least one object in the environment.

10. The method of claim 1, wherein the SAR unit is mounted in a forward-facing direction, a rear-facing direction, a side-facing direction, or a squinted direction of the terrestrial vehicle.

11. The method of claim 1, wherein the vehicle position sensor comprises at least one member selected from the group consisting of an inertial measurement unit, a Global Navigation Satellite System (GNSS) receiver, a camera, a light detection and ranging (lidar) unit, a wheel encoder, and a radar.

12. The method of claim 6, wherein the pose comprises a position, orientation, and velocity of the terrestrial vehicle.

13. The method of claim 12, wherein the map comprises a SAR-based image comprising a plurality of features located within the environment.

14. The method of claim 13, wherein the map comprises a high definition (HD) map of the environment.

15. The method of claim 13, further comprising:
updating the pose of the terrestrial vehicle based on a movement of the terrestrial vehicle through the environment.

16. The method of claim 15, further comprising:
generating a plurality of SAR-based images or a plurality of SAR-based velocity estimates based on the movement of the terrestrial vehicle through the environment; and
updating the pose of the terrestrial vehicle based on the plurality of SAR-based images or the plurality of SAR-based velocity estimates.

17. The method of claim 15, further comprising:
determining a refined tracklog of the terrestrial vehicle based on the updated pose.

18. The method of claim 17, further comprising:
updating one or more previously generated SAR-based images or a localization result of the terrestrial vehicle based on the refined tracklog.

19. The method of claim 17, further comprising:
generating tracklog estimates and SAR-based images based on the refined tracklog without modifying one or more previously generated SAR-based images or a localization result of the terrestrial vehicle.

20. The method of claim 6, further comprising:
determining the pose of the terrestrial vehicle by comparing a set of features in a selected local map with a set of features in the regional map.

21. The method of claim 1, further comprising:
determining a common clock; and
providing the common clock to the SAR unit and the vehicle position sensor, wherein the second set of signals and the third set of signals are temporally synchronized based on the common clock.

22. The method of claim 1, further comprising:
receiving a clock signal from the SAR unit or the vehicle position sensor, wherein the second set of signals and the third set of signals are temporally synchronized based on the clock signal.

23. The method of claim 22, wherein the clock signal comprises a predetermined output rate.

24. The method of claim 22, wherein the clock signal is determined based on a sampling frequency of the SAR unit.

25. The method of claim 1, further comprising:
determining a phase shift measurement based on a difference in phase between the first set of signals and the second set of signals, wherein the second set of signals and the third set of signals are temporally synchronized based on the phase shift measurement.

26. The method of claim 1, further comprising:
determining the pulse repetition frequency based on a maximum velocity of the terrestrial vehicle and a value defined according to a center frequency of successive radar pulses.

27. The method of claim 1, further comprising:
determining the pulse repetition frequency based on an inverse of a time duration for the terrestrial vehicle to travel a set fraction of a wavelength of radar pulses transmitted by the SAR unit.

28. A system for generating a map, comprising:
a first synthetic aperture radar (SAR) unit mountable to a terrestrial vehicle;
a second SAR unit mountable to the terrestrial vehicle; and
a computer processor operatively coupled to the first SAR unit and the second SAR unit, wherein the computer processor is programmed to:
provide a lower and upper cutoff frequency to the first SAR unit and the second SAR unit;
transmit, via the first SAR unit and the second SAR unit, a first set of signals based on the lower and upper cutoff frequency to an environment external to the terrestrial vehicle;
receive, via the first SAR unit, a second set of signals from the environment;
receive, via the second SAR unit, a third set of signals from the environment;
generate a synchronized set of signals by temporally synchronizing the second set of signals and the third set of signals; and
generate the map of the environment based on the synchronized set of signals.

29. The system of claim 28, further comprising the terrestrial vehicle, wherein the first SAR unit and the second SAR unit are mounted on the terrestrial vehicle.

30. The system of claim 28, further comprising:
a vehicle position sensor mountable to the terrestrial vehicle;
wherein the computer processor is operatively coupled to the vehicle position sensor and further configured to:
receive, from the vehicle position sensor, a fourth set of signals comprising position, orientation, and velocity measurements of the terrestrial vehicle; and
generate the synchronized set of signals by temporally synchronizing the second set of signals, the third set of signals, and the fourth set of signals.

31. The system of claim 30, wherein the vehicle position sensor comprises at least one member selected from the group consisting of an inertial measurement unit, a Global Navigation Satellite System (GNSS) receiver, a camera, a light detection and ranging (lidar) unit, a wheel encoder, and a radar.

32. The system of claim 30, wherein the computer processor is further configured to:
    determine a common clock; and
    provide the common clock to the first SAR unit, the second SAR unit, and the vehicle position sensor, wherein the second set of signals, the third set of signals, and the fourth set of signals are temporally synchronized based on the common clock.

33. The system of claim 28, wherein the computer processor is further programmed to:
    determine the lower and upper cutoff frequency based on a maximum velocity of the terrestrial vehicle.

34. The system of claim 28, wherein the computer processor is further programmed to:
    determine the lower and upper cutoff frequency based on an inverse of a time duration for the terrestrial vehicle to travel a set fraction of a wavelength of radar pulses transmitted by the first SAR unit or the second SAR unit.

* * * * *